(No Model.)  2 Sheets—Sheet 1.
J. R. BROUGHT.
BREAKING APPARATUS FOR HORSES.

No. 422,497.  Patented Mar. 4, 1890.

WITNESSES  INVENTOR (No Model.) 2 Sheets—Sheet 2.

J. R. BROUGHT.
BREAKING APPARATUS FOR HORSES.

No. 422,497. Patented Mar. 4, 1890.

WITNESSES

INVENTOR
J. R. Brought
by Herbert W. T. Jenner.
Attorney

UNITED STATES PATENT OFFICE.

JONATHAN R. BROUGHT, OF LAWRENCE, KANSAS.

BREAKING APPARATUS FOR HORSES.

SPECIFICATION forming part of Letters Patent No. 422,497, dated March 4, 1890.

Application filed November 23, 1889. Serial No. 331,334. (No model.)

*To all whom it may concern:*

Be it known that I, JONATHAN R. BROUGHT, a citizen of the United States, residing at Lawrence, in the county of Douglas and State of Kansas, have invented certain new and useful Improvements in Breaking Apparatus for Horses; and I do hereby declare the following to be a full, clear, and exact description of the invention, such as will enable others skilled in the art to which it appertains to make and use the same.

This invention relates to apparatus for breaking horses when young and for controlling them afterward when they show vicious temper in riding or driving.

This invention consists in the novel construction and combination of the parts hereinafter fully described and claimed.

Figure 1:
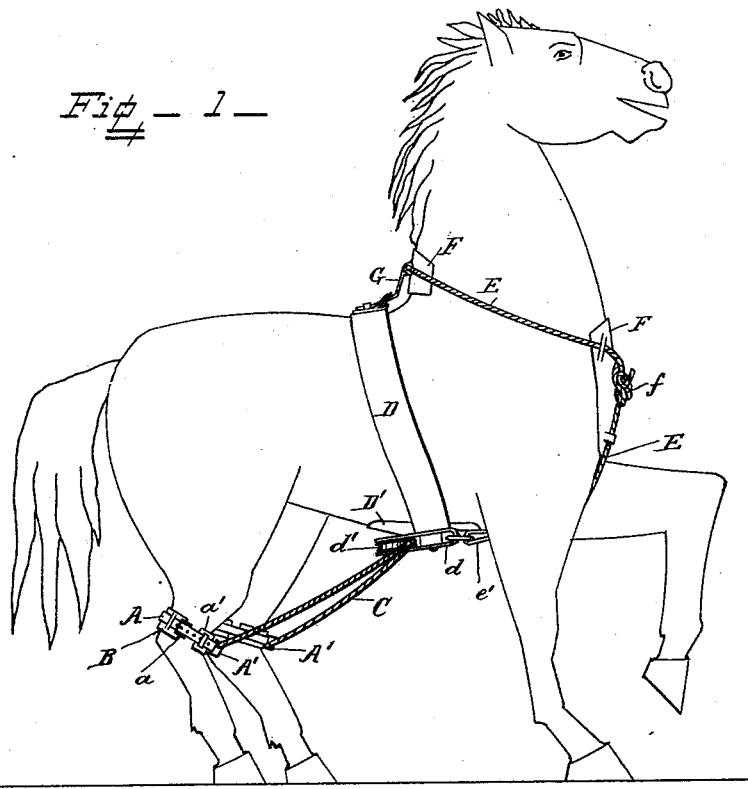
Figure 2:
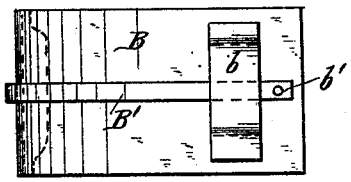
Figure 3:
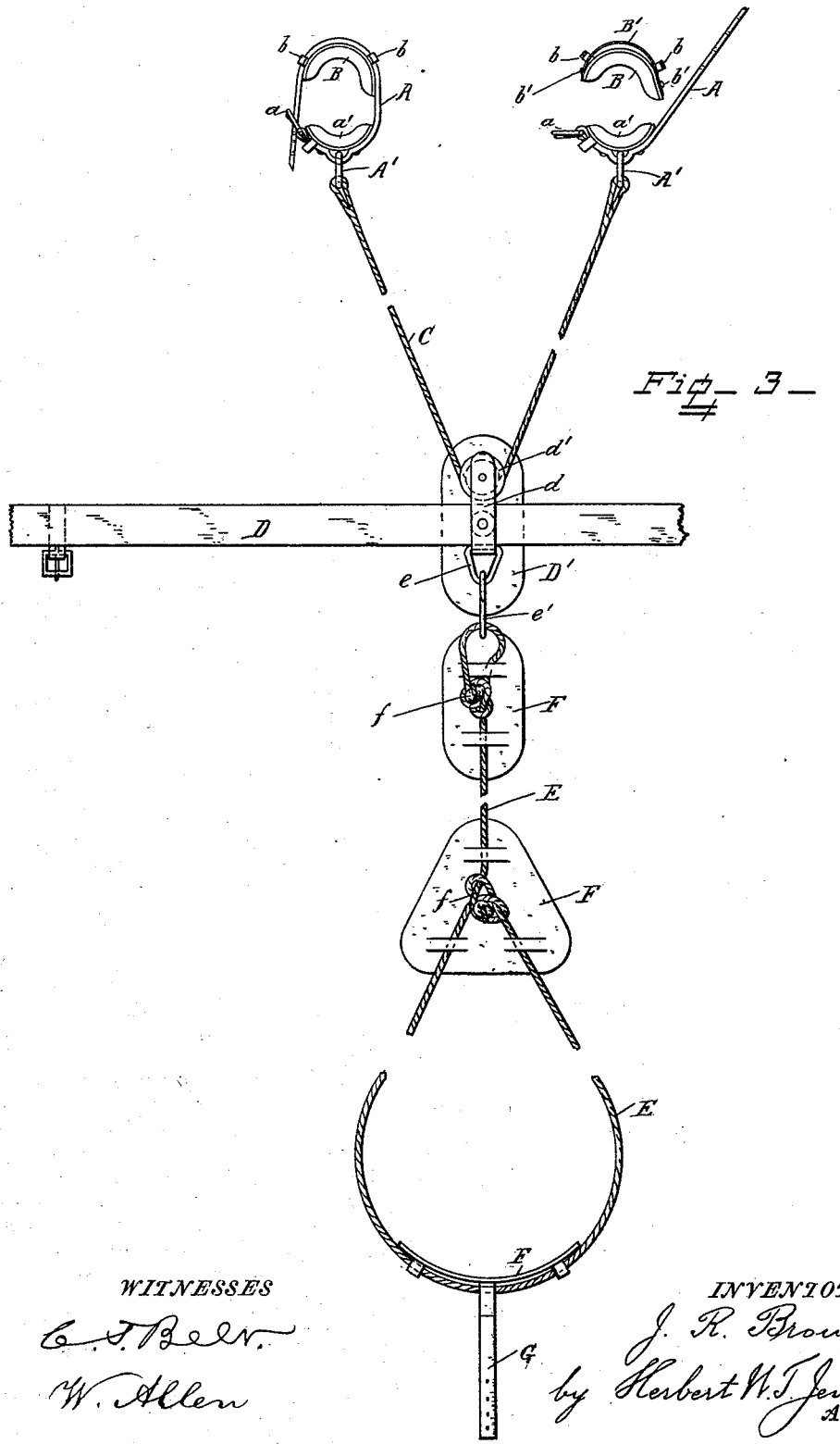

In the drawings, Figure 1 is a side view of a horse having the apparatus applied to it. Fig. 2 is a detail side view of the adjustable pad of the leg-strap, showing the spring. Fig. 3 is a plan view of the apparatus from below spread out to show every part of it.

A is the leg-strap, provided with the buckle $a$ and the loop A'. A fixed pad $a'$ is secured to the strap behind the loop, and B is an adjustable pad sliding lengthwise on the strap and connected to it by loops $b$. B' is a metallic spring interposed between the pad and the strap, and $b'$ are rivets for securing the ends of the spring to the pad. The straps A encircle the legs of the horse and the springs prevent the adjustable pads from slipping after their position is once fixed against the legs of the horse, and they also keep the pads in good shape and prevent chafing and undue pressure upon the tendons.

C is a cord, the ends of which are secured to the loops A' of the leg-straps.

D is a girth or surcingle, which is passed around the body of the animal and has its ends secured in the usual manner.

D' is a pad secured to the inside of the girth under the belly of the horse, and $d$ is a metallic frame secured to the outside of the girth. A pulley $d'$ is journaled upon a pin in the frame $d$, and the middle part of cord C is passed around the said pulley, so that the horse may move its legs alternately as fast as it likes, but cannot move them both at once, as in the act of kicking.

The pulley and its frame are secured from slipping by means of the flexible band or cord E, which is passed around the neck of the horse and has its end secured to the frame $d$ by the loop $e$ and snap-hook $e'$.

F are pads arranged under the knotted ends $f$ and those portions of the cord which would be most likely to chafe the skin of the horse.

G is a short strap, which connects the loop of the cord over the head at the back of the neck with the girth on top of the back and prevents the cord which surrounds the neck from slipping over the head of the animal when it stoops to eat or drink.

For horses which have the habit of prancing the hock-straps A may be applied to the fore legs and the girth moved and secured farther back under the belly to give room for the cord to work over the pulley in the reverse direction to that shown in Fig. 1.

What I claim is—

1. The combination, with the two leg-straps provided with loops, the fixed pads secured behind the loops, the adjustable sliding pads, and the metallic retaining-springs interposed between said straps and adjustable pads, said devices being adapted for attachment to the legs of the animal close above the middle joints, of a pulley journaled in a frame and secured under the belly of the animal, and a cord passing over said pulley and having its ends secured to the said loops on the straps, substantially as and for the purpose set forth.

2. The combination, with the girth, of the revoluble pulley and the pulley-frame secured to the girth, the flexible band or cord provided with pads and passing around the neck of the animal with its end secured to the pulley-frame under the belly, the short strap connecting the cord behind the head with the girth on top of the back, the cord passing over the said pulley, and the hock-straps provided with adjustable sliding pads and retaining-springs, and having the ends of said cord secured to them, substantially as and for the purpose set forth.

In testimony whereof I affix my signature in presence of two witnesses.

JONATHAN R. BROUGHT.

Witnesses:
F. W. APITZ,
JEREMIAH BROOKS.